No. 777,644. PATENTED DEC. 13, 1904.
E. H. SCHULZ.
PROTECTIVE DISAPPEARING PLATFORM FOR SEARCH LIGHT PROJECTORS.
APPLICATION FILED JUNE 18, 1903.
NO MODEL. 2 SHEETS—SHEET 1.

Witnesses.
Emil F. Maurn
Frank M. Ingalls

Inventor:
Edward H. Schulz

No. 777,644. PATENTED DEC. 13, 1904.
E. H. SCHULZ.
PROTECTIVE DISAPPEARING PLATFORM FOR SEARCH LIGHT PROJECTORS.
APPLICATION FILED JUNE 18, 1903.
NO MODEL. 2 SHEETS—SHEET 2.
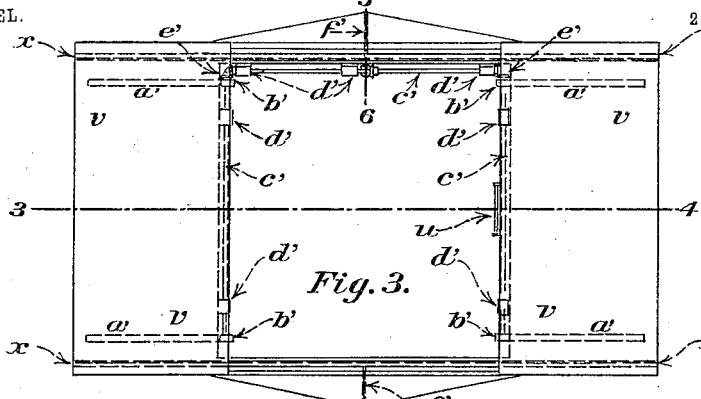
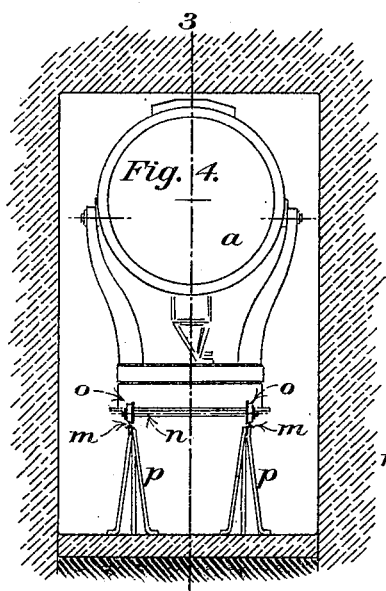
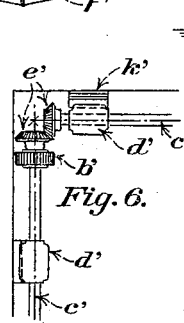
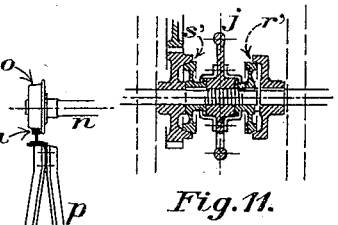
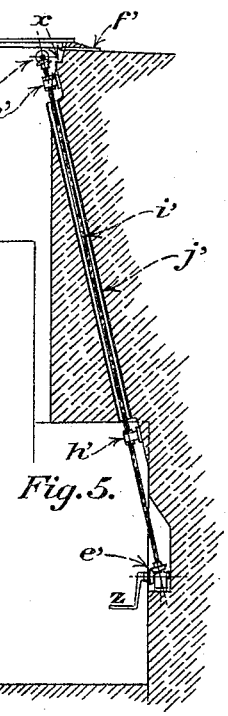
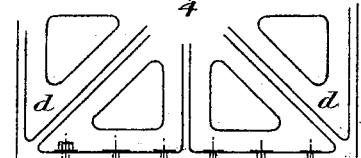
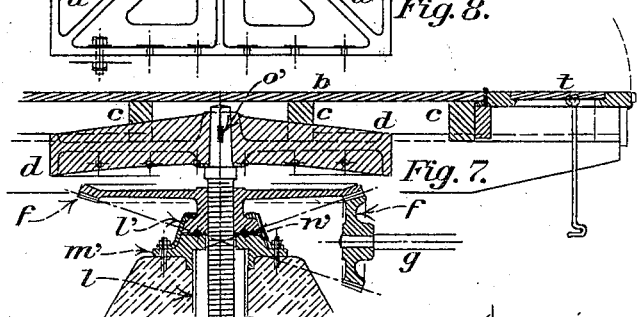
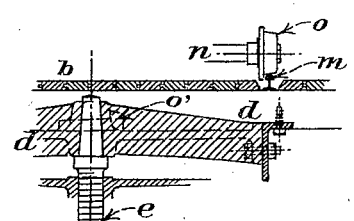
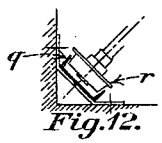
Witnesses
Emil F. Maurer
Frank M. Ingalls
Inventor
Edward H. Schulz No. 777,644. Patented December 13, 1904.

UNITED STATES PATENT OFFICE.

EDWARD H. SCHULZ, OF THE UNITED STATES ARMY.

PROTECTIVE DISAPPEARING PLATFORM FOR SEARCH-LIGHT PROJECTORS.

SPECIFICATION forming part of Letters Patent No. 777,644, dated December 13, 1904.

Application filed June 18, 1903. Serial No. 162,030. (No model.)

*To all whom it may concern:*

Be it known that I, EDWARD H. SCHULZ, first lieutenant, Corps of Engineers, United States Army, a citizen of the United States, residing at Fort Wadsworth, in the county of Richmond and State of New York, have invented a new and useful Protective Disappearing Platform for Search-Light Projectors and other Purposes, of which the following is a specification.

My invention may be used by the Government or any of its officers or employees in prosecution of work for the Government or by any other person in the United States without payment to me of any royalty thereon, and relates to a disappearing platform upon which is to be mounted a search-light projector or other objects for defensive purposes in connection with coast fortifications and other operations.

The objects of my improvement are, first, to provide a suitable platform for a modern sixty-inch search-light projector or other size, which may be elevated or depressed by electric, hand, or other power, to be elevated when in use and to be at other times depressed and concealed; second, to afford suitable concrete and earth protection for the projector and personnel from hostile fire when concealed and to furnish a partial protection when in use; third, to provide a vertical protection by means of horizontal steel shutters to close the shaft or well, which shutters may be easily moved by suitable gearing when desired, and, fourth, to provide a means of moving the search-light to the rear for repair, &c., and also of readily removing it from the emplacement when desired. I attain these objects by the mechanism illustrated in the accompanying drawings, marked Sheets 1 and 2, on which—

Figure 1:
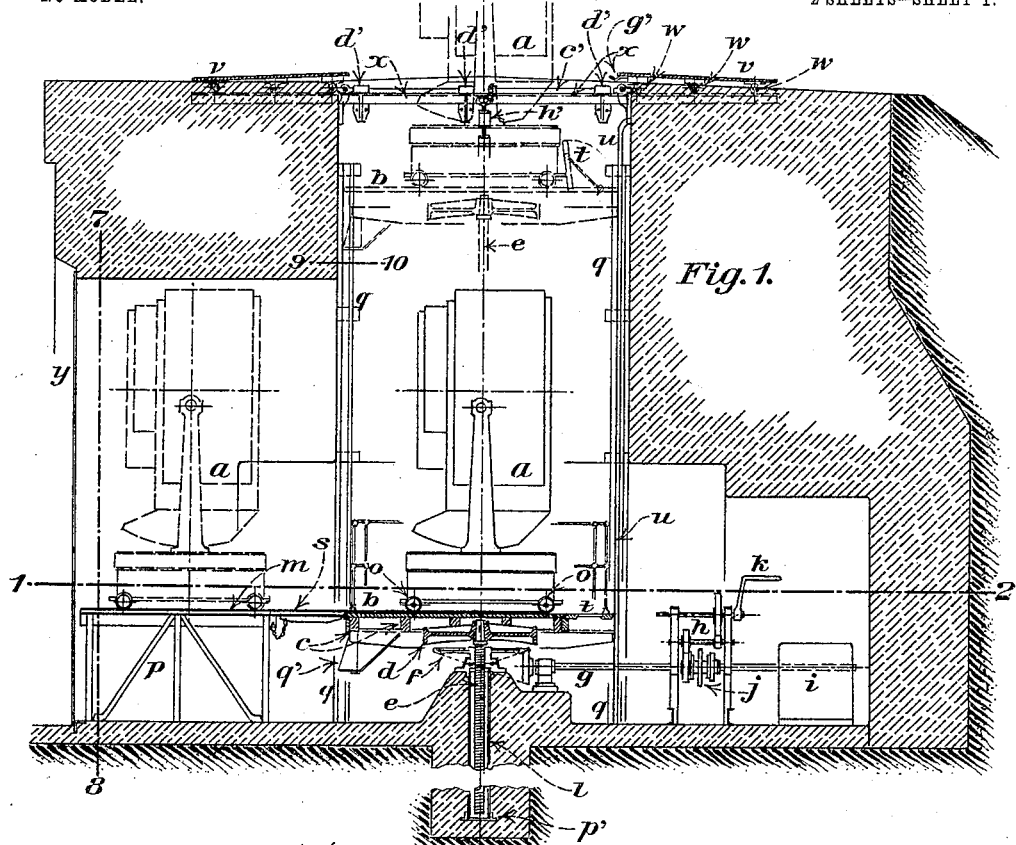
Figure 2:
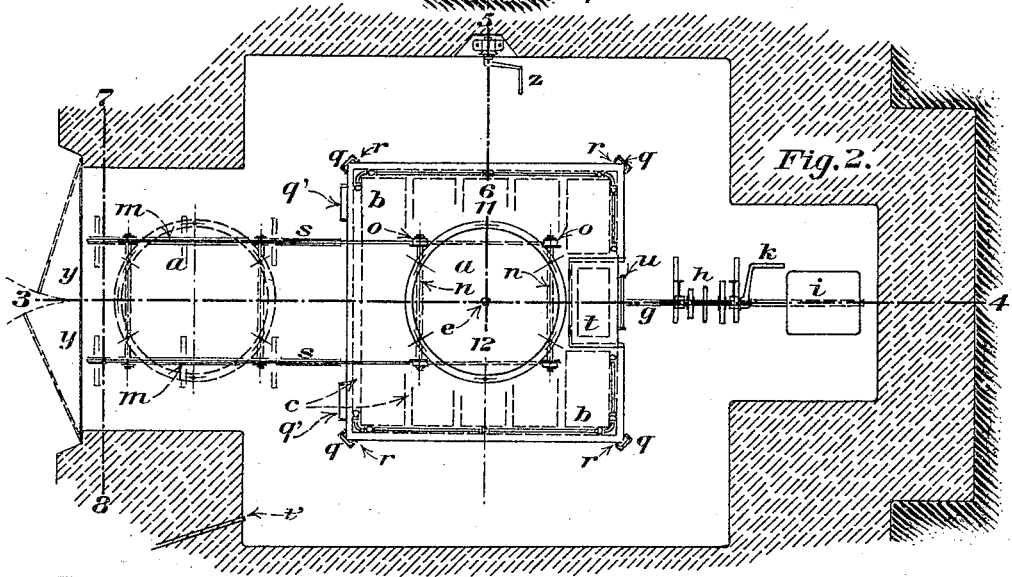

Figure 1 is a vertical section through the search-light projector and emplacement, taken on line 3 4 of Fig. 2, and shows the projector in three positions—viz., at top when in use, in lowered position, and when withdrawn. Fig. 2 is a horizontal section through the search-light and emplacement, taken on line 1 2 of Fig. 1. Fig. 3 is a plan at top of emplacement, showing horizontal shutters when open. Fig. 4 is a vertical section on line 7 8 of Figs. 1 and 2 near entrance-doors. Fig. 5 is a vertical section on line 5 6 of Fig. 2, showing method of operating horizontal shutters at top of well. Fig. 6 is an enlarged plan of bevel-gears, bearings, shaft, &c., showing part of mechanism to operate horizontal shutters at top of emplacement. Fig. 7 is an enlarged section on line 3 4 of Fig. 2, taken at top of elevating-screw and showing construction, details of platform, casting, elevating bevel-gears, &c. Fig. 8 is a part plan of casting connecting top of elevating-screw to beams of platform. Fig. 9 is an enlarged section on line 11 12 of Fig. 2. Fig. 10 is an enlarged detail at top of track for the search-light wheels. Fig. 11 is a detail of friction-clutch for throwing into gear either hand or electric power. Fig. 12 is a section at 9 10 of Fig. 1, showing vertical channel-guides for platform guide-wheels secured to each corner of platform.

Similar letters refer to similar parts throughout the several views.

A description of the mechanism and its operation is as follows:

$a$, the search-light projector, by means of small wheels $o$, rests on the track on the platform $b$. The platform is supported by the supporting-beams $c$ and connected to the elevating-screw $e$ by the casting $d$.

$b$ is the platform on which rests the projector $a$; $c$, the supporting-beams for the platform $b$; $d$, the casting connecting the elevating-screw $e$ with supporting-beams $c$; $e$, the elevating-screw; $f$, the bevel-gear and pinion by means of which the elevation or depression of the platform and projector is attained.

$g$, the pinion-shaft, is rotated by crank (hand) or motor, according as the cone $s'$ of friction-clutch is in contact for hand-power or the cone $r'$ for motor-power, the desired contact being attained by turning the handwheel $j$.

$h$ is the hand-power winch; $i$, the motor, provided with switches on the platform and at the motor and with automatic safety cutouts to operate when the platform is at the extreme limit of motion up or down; $j$, the hand-wheel of friction-clutch; $k$, the crank-handle of the winch; $l$, the wrought-iron tube set in the concrete filled with oil, in which tube the elevating-screw $e$ is free to move. Screwed to the bottom of the tube is a cast-iron cap $p'$.

$m$ is the rails on the framed track-support $p$, upon which move the projector-wheels $o$, connected to the base of projector by axles $n$; $n$, the axles bolted to the base of the projector and carrying the wheels $o$; $o$, the projector-wheels; $p$, the framed track-support to move the projector to the rear; $q$, the vertical channel guide-rails, one at each corner of well. In these rails run the platform guide-wheels $r$.

$r$ is the platform guide-wheels; $s$, the movable sections of track-rails, which act as a bridge between the projector-platform $b$ and track-support $p$; $t$, a trap-door in platform $b$, through which the platform may be reached when elevated; $u$, the ladder leading to trap-door when platform is elevated; $v$, the horizontal shutters of one-inch-thick steel placed at top of well and which rest on rollers $w$, moving on angle-bar rails $x$; $w$, the rollers on which rest the horizontal shutters $v$; $x$, the angle-bar rails for the shutter-rollers $w$; $y$, the entrance-doors to the emplacement; $z$, the crank to the vertical shaft $i'$, which gives motion to the horizontal shafts $c'$, by means of which the horizontal shutters $v$ are operated; $a'$ the rack, and $b'$ the pinion which move the horizontal shutters; $b'$, the pinion to rack $a'$; $c'$, the horizontal shafts of shutter-operating mechanism; $d'$, the bearings of horizontal shafts $c'$; $e'$, the bevel-gears of shutter-operating mechanism; $f'$, the drain for drip-trough $g'$ of shutter; $g'$, the gutter and drip-trough attached to horizontal shutter; $h'$, the bearings of vertical shaft $i'$; $i'$, the vertical shaft for operating shutters; $j'$, the wrought-iron pipe inclosing vertical shaft $i'$; $k'$, the adjusting-plates for horizontal shafts $c'$; $l'$, the sleeve holding down the rim of the bevel-gear $f$ for raising or lowering platform; $m'$, the flanged casting screwed to top of wrought-iron pipe $l$, inclosing elevating-screw $e$; $n'$, the ball-bearing between bevel-gear $f$ and flanged casting $m'$; $o'$, the key locking the casting $d$; $p'$, the cast-iron cap screwed to bottom of wrought-iron pipe $l$; $q'$, the step to platform; $r'$, the contact-cone of friction-clutch for motor-power; $s'$, the contact-cone of friction-clutch for hand-power; $t'$, the duct for entrance of electric wires.

I am aware that prior to my invention search-light projectors have been mounted on concealed platforms, trucks, &c. I therefore do not claim the use of a projector on such a mount; but What I do claim as my invention, and desire to secure by Letters Patent, is—

The combination of an earthwork emplacement provided with a vertical well and a lateral entrance-way, a platform movable vertically in the vertical well, tracks on the platform, tracks in the lateral entrance-way, and a search-light for movement on the tracks in the entrance-way and on the platform.

In witness whereof I have signed my name to this specification in the presence of two subscribing witnesses.

EDWARD H. SCHULZ.

Witnesses:
  EMIL F. MAURER,
  FRANK M. INGALLS.